United States Patent
Baydoun (10) Patent No.: US 10,414,353 B2
(45) Date of Patent: Sep. 17, 2019

(54) GROMMET WITH TIE-STRAP TOWER

(71) Applicant: Ford Global Technologies, LLC, Dearborn, MI (US)

(72) Inventor: Mohammed Michael Baydoun, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

(21) Appl. No.: 15/427,040

(22) Filed: Feb. 7, 2017

(65) Prior Publication Data

US 2018/0222406 A1 Aug. 9, 2018

(51) Int. Cl.
*H01B 17/26* (2006.01)
*B60R 16/02* (2006.01)

(52) U.S. Cl.
CPC .................. *B60R 16/0222* (2013.01)

(58) Field of Classification Search
CPC .................................. B60R 16/0222
USPC ................. 285/140.1, 141.1, 202, 204, 213; 174/152 G, 153 G
See application file for complete search history.

(56) References Cited

U.S. PATENT DOCUMENTS

| | | | |
|---|---|---|---|
| 2,067,439 A * | 1/1937 | Dooley | B01D 27/06 285/202 |
| 5,792,995 A | 8/1998 | Takada et al. | |
| 6,259,028 B1 | 7/2001 | Senma | |
| 6,660,937 B1 | 12/2003 | MacLeod et al. | |
| 7,053,304 B2 | 5/2006 | Ojima et al. | |
| 7,202,415 B2 | 4/2007 | Fujita | |
| 7,943,854 B1 | 5/2011 | Lipp | |
| 8,022,304 B2 | 9/2011 | Baydoun et al. | |
| 8,261,409 B2 * | 9/2012 | Magennis | F16L 5/027 |
| 8,530,761 B2 | 9/2013 | Baydoun et al. | |
| 8,648,259 B2 * | 2/2014 | Gniewek | H02G 3/0468 174/153 G |
| 9,130,298 B1 | 9/2015 | Baydoun et al. | |
| 2010/0307794 A1 | 12/2010 | Baydoun et al. | |
| 2013/0140060 A1 | 6/2013 | Baydoun | |
| 2014/0190725 A1 | 7/2014 | Baydoun | |
| 2015/0236440 A1 | 8/2015 | Baydoun | |

(Continued)

FOREIGN PATENT DOCUMENTS

| | | |
|---|---|---|
| DE | 4436778 A1 | 4/1996 |
| DE | 102010022639 A1 | 12/2010 |
| FR | 2904398 A1 | 2/2008 |

(Continued)

OTHER PUBLICATIONS

Search Report dated Jul. 20, 2018 for GB Patent Application No. GB 1801823.4 (4 pages).

(Continued)

*Primary Examiner* — Greg Binda
(74) *Attorney, Agent, or Firm* — Frank Lollo; Neal, Gerber & Eisenberg LLP; James P. Muraff (57) ABSTRACT

A grommet for protecting a tube includes a first port, a second port, and a flexible bellows disposed therebetween. The first port defines a central axis and includes: a conduit leading to the bellows and a first strap tower defining at least one first strap aperture. A tube extends out of the conduit. A first strap is wrapped around the tube and extends through the at least one first strap aperture to securing the tube to the first strap tower.

11 Claims, 9 Drawing Sheets

(56) References Cited

U.S. PATENT DOCUMENTS

2018/0222405 A1\* 8/2018 Baydoun ............ B60R 16/0222

FOREIGN PATENT DOCUMENTS

| JP | H 08106831 A | 4/1996 |
| JP | H 08106832 A | 4/1996 |
| JP | H 08106833 A | 4/1996 |
| JP | H 10117418 A | 5/1998 |
| JP | 2000264140 A | 9/2000 |
| JP | 2011172386 A | 2/2013 |

OTHER PUBLICATIONS

Search Report dated Jul. 18, 2018 for GB Patent Application No. GB 1801849.9 (4 pages).

\* cited by examiner

GROMMET WITH TIE-STRAP TOWER

CROSS REFERENCE

This application relates to U.S. patent application Ser. No. 15/427,033 filed on Feb. 7, 2017, which is hereby incorporated by reference in its entirety.

TECHNICAL FIELD

This application relates to a grommet for shielding tubes and electrical cables.

BACKGROUND

A grommet is often used to shield tubes and electric cables passing from a body of a vehicle to a door of a vehicle. One end of the grommet attaches to the body. The opposite end attaches to the door. The grommet includes a flexible bellows that contracts or expands when the door moves toward the body and expands or contracts (i.e., does the opposite) when the door moves away from the body. A tube or wire passes through the grommet, thus enabling a fluid or electrical connection between the body and the door.

SUMMARY

Disclosed is a grommet for protecting a tube, the grommet including a first port, a second port, and a flexible bellows disposed therebetween. The first port defines a central axis and includes: a conduit leading to the bellows and a first strap tower defining at least one first strap aperture. A tube extends out of the conduit. A first strap is wrapped around the tube and extends through the at least one first strap aperture to securing the tube to the first strap tower.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

German Publication No. DE 102010022639A1 discloses a grommet. The present application relates to the grommets and grommet assemblies disclosed in U.S. Pat. Nos. 9,130,298, 8,530,761, and 8,022,304; U.S. Publication Nos. 2015/0236440, 2014/0190725, 2013/0140060, 2010/0307794. All of these documents are hereby incorporated by reference in their entireties. Any of these grommets or grommet assemblies may include strap towers 62, 64. Grommet 10 may include any features of the grommets or grommet assemblies disclosed in these documents.

Figure 1:
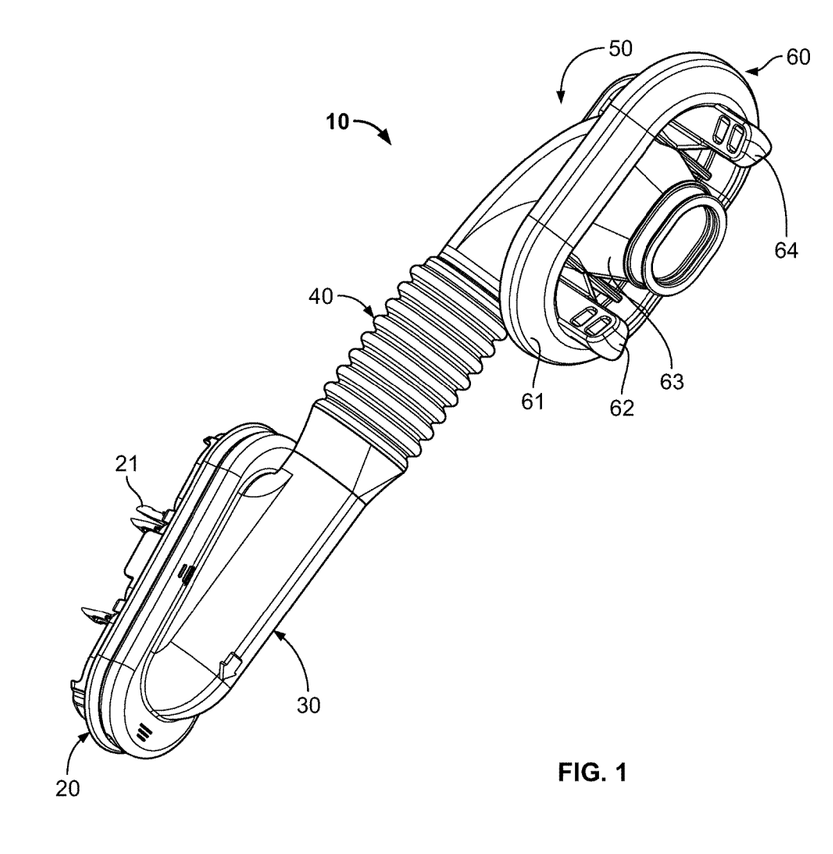
FIG. 1 is an isometric view of a grommet.
Figure 2:
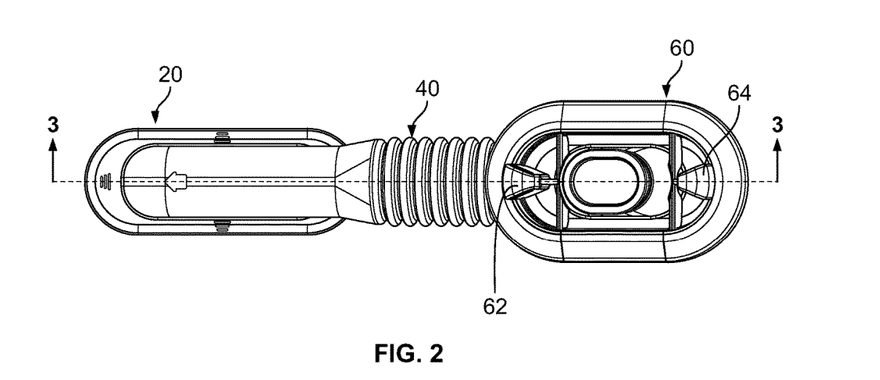
FIG. 2 is a top plan view of the grommet.
Figure 3:
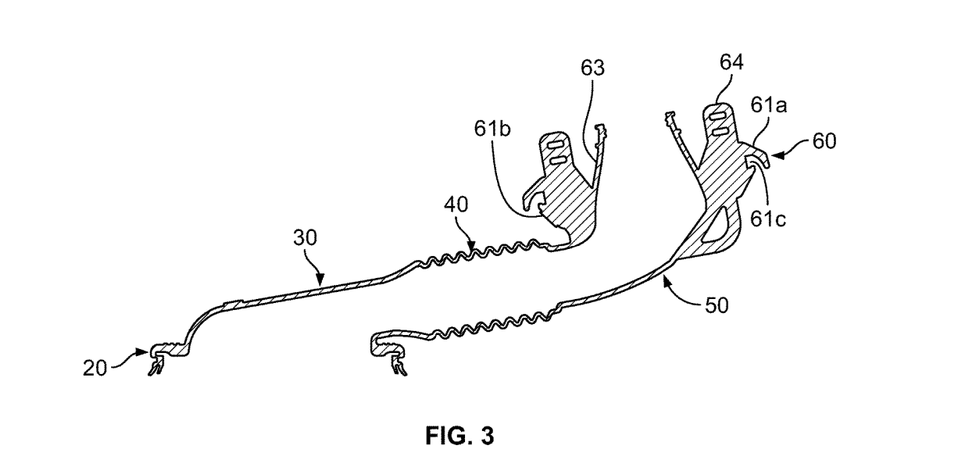
FIG. 3 is a cross sectional view of the grommet taken along 3-3 of FIG. 2.

Referring to FIG. 1, grommet 10 includes a body port 20, a first rigid tube 30, a flexible bellows 40, a second rigid tube 50, and a door port 60. Body port 20 is mounted to a body of a vehicle and extends through a body port aperture defined by the body. Door port 60 is mounted to a door of the vehicle (e.g., a driver door, a passenger door, a trunk) and extends through a door port aperture defined by the door. An electrical cable or a fluid tube (collectively referred to as a tube) extends through body port 20, first rigid tube 30, flexible bellows 40, second rigid tube 50, and door port 60. The tube begins inside of the body and ends inside the door. Without grommet 10, the tube would be exposed to ambient between the body and the door. With grommet 10, no portion of the tube is externally visible. Grommet 10 may include a rubber. Grommet 10 may be made exclusively from a rubber.

Figure 8:
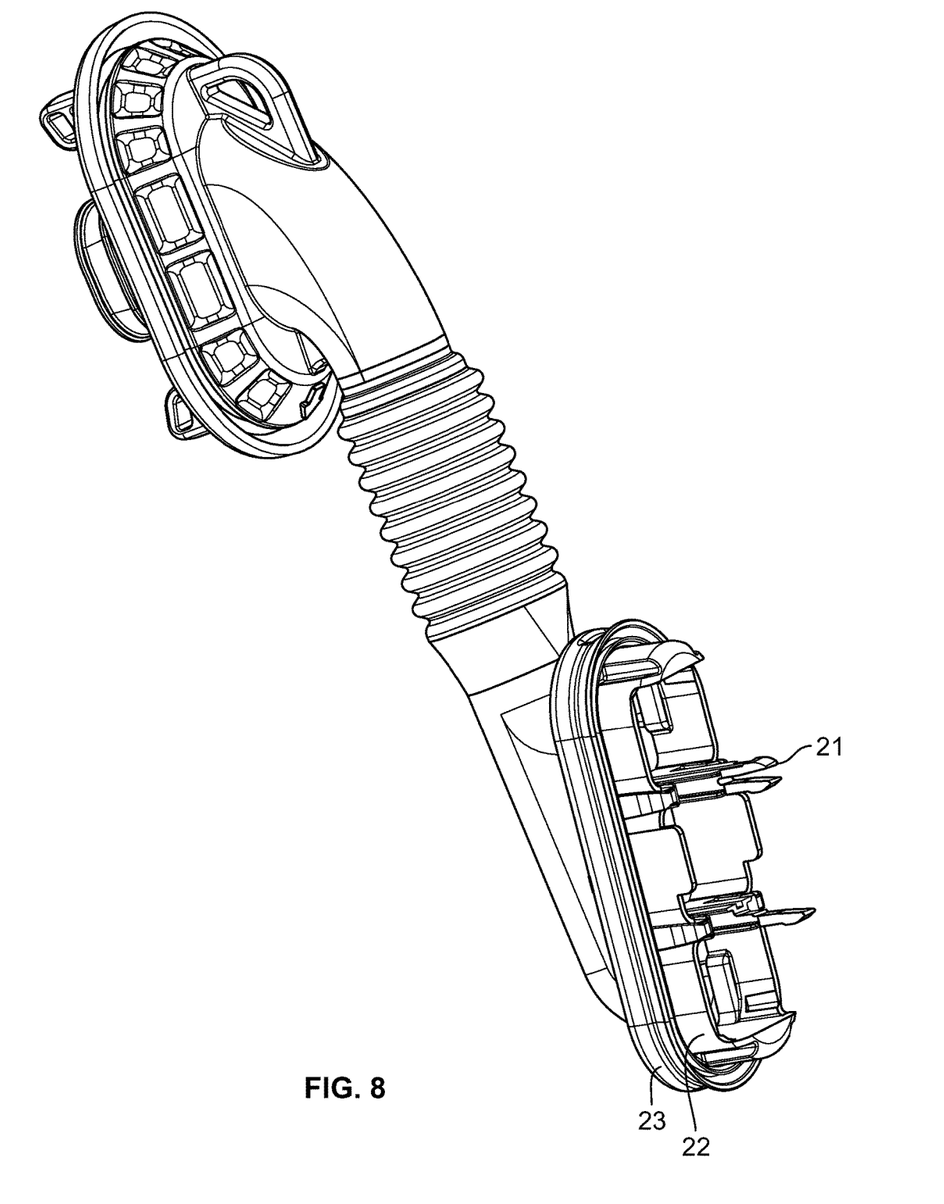
FIG. 8 is an isometric view of the grommet.

As shown in FIGS. 1 and 8, body port 20 includes at least one expanding clip 21, walls 22, and a plurality of oval edges. Clip 21 fits through a small aperture defined in the vehicle body. In order to fit through the small aperture, clip 21 is compressed such that the two opposing protrusions (not labeled) are squeezed together. After clip 21 is inserted into the small aperture, clip 21 expands, thus securing body port 20 with respect to the vehicle body. Walls 22 extend through the body port aperture defined in the body. One of the oval edges lies flush against an outer panel of the body defining the body port aperture. As such, at least a portion of body port 20 does not extend through the body port aperture.

First rigid tube 30 extends at a desired angle with respect to body port 20. Second rigid tube 50 extends at a desired angle with respect to door port 60. Bellows 40 is disposed in between first and second rigid tubes 30, 50.

Figures 4, 5:
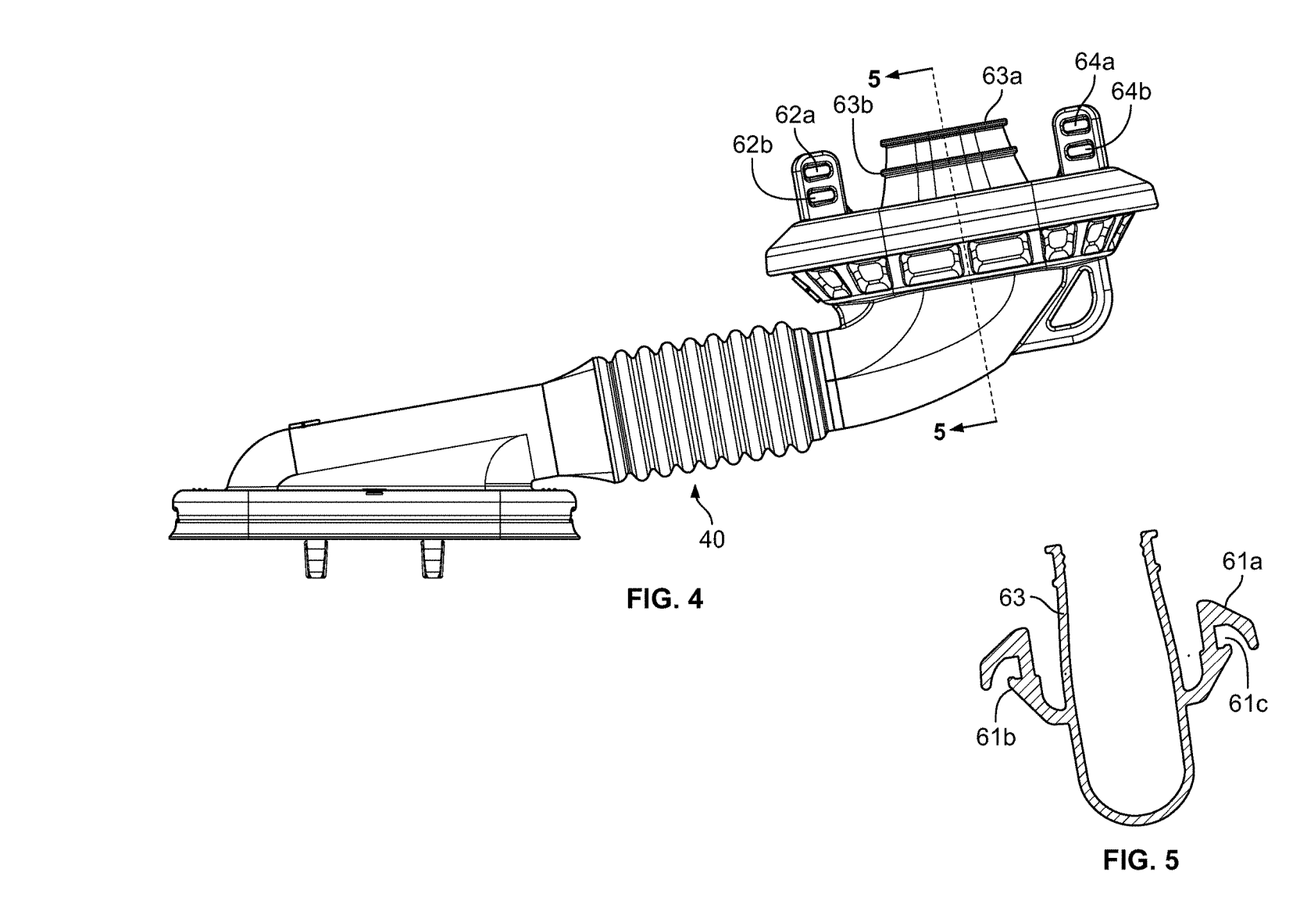
FIG. 4 is a side elevational view of the grommet.
FIG. 5 is a cross sectional view of the grommet taken along 5-5 of FIG. 4.
Figure 6:
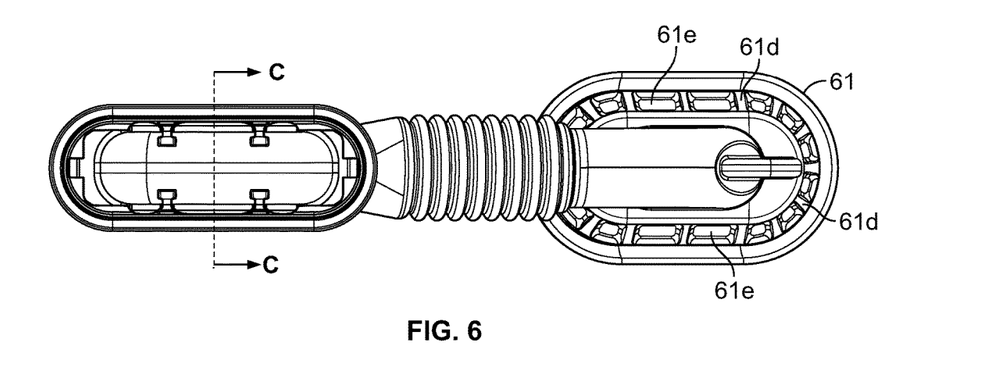
FIG. 6 is a bottom plan view of the grommet.
Figure 7:
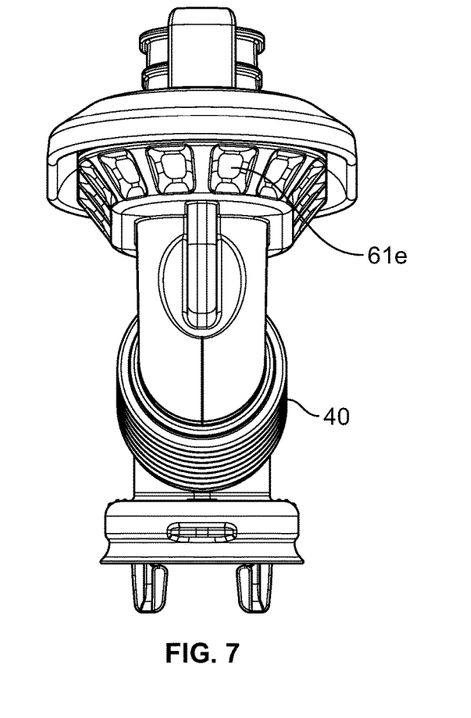
FIG. 7 is a front elevational view of the grommet.

Door port 60 includes an oval shaped body 61, a pair of opposing strap towers 62, 64, and a conduit 63. With reference to FIG. 5, body 61 includes an annular lip 61a and a plurality of ridges 61b. A plurality of inner notches 61c are defined between each ridge 61b and annular lip 61a. An annular and oval shaped projection of the door fits inside the plurality of inner notches 61c. Ridges 61b and annular lip 61a compressively bear on the annular and oval shaped projection to retain door port 60 with respect to the door. Recesses 61e are defined between consecutive ribs 61d, which bear on door panel 92 (see FIG. 9).

As shown in FIGS. 1 to 4, strap towers 62, 64 are tapered thus resembling slices of a cake. More specifically, strap towers 62, 64 include a narrow end facing conduit 63 and a wide end facing oval shaped body 61. Strap towers 62, 64 protrude from door port 60 parallel with a central axis of oval shaped body 61 and a central axis of conduit 63, when in an upright position as shown in FIGS. 1 to 4.

Strap towers 62, 64 define strap apertures 62a, 62b, 64a, 64b for receiving one or more cable straps. Strap apertures 62a, 62b, 64a, 64b extend through a full width of strap towers 62, 64. Conduit 63 is tapered. As shown in FIG. 4, conduit 63 includes a pair of outwardly projecting lips 63a, 63b. According to some embodiments, conduit 63 is rigid and non-flexible. Strap apertures 62a, 64a are disposed equal distances from oval shaped body as are strap apertures 62b, 64b. Strap apertures 62a, 62b extend in a parallel direction. Strap apertures 64a, 64b extend in a parallel direction. Strap apertures 62a, 62b, 64a, 64b extend in a parallel direction. Door port 60 may include strap towers disposed at any location with respect to conduit 63. One embodiment includes four strap towers disposed at equal 90 degree intervals about conduit 63.

Figure 9:
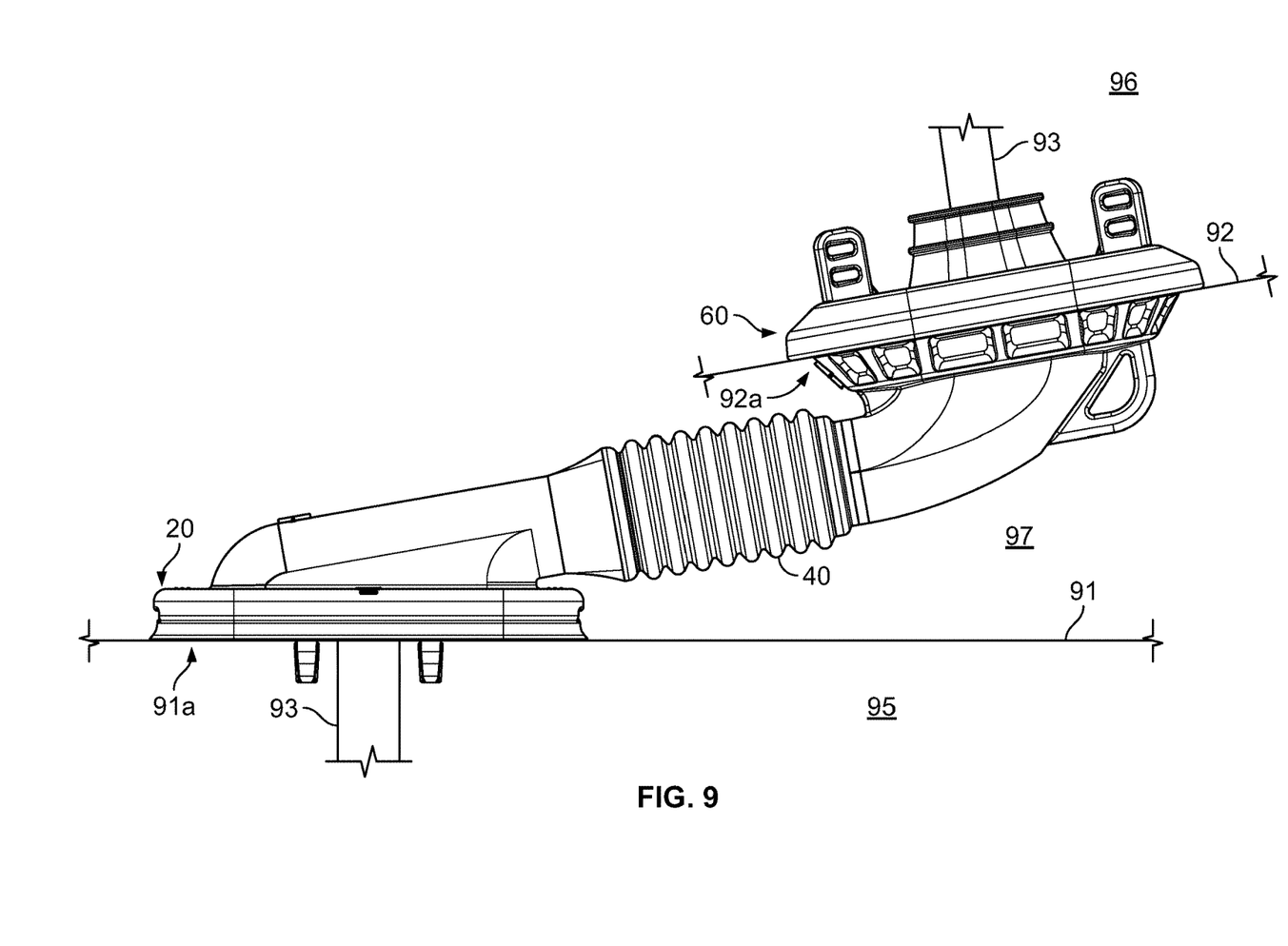
FIG. 9 is a side elevational view of the grommet connected with a vehicle body and a vehicle door.

FIG. 9 schematically illustrates an application of grommet 10 without the use of strap towers 62, 64. Walls 22 are omitted. The vehicle body includes a body panel 91 defining body port aperture 91a. The vehicle body defines an interior body cavity 95. The door includes a door panel 92 defining door port aperture 92a. The door defines an interior door cavity 96. Tube 93 extends from interior body cavity 95, through grommet 10, and into door cavity 96. Due rotation of the door, door panel 92 moves with respect to body panel 91. As such, bellows 40 flexes. Grommet 10 is exposed to ambient 97 (i.e., visible to a user when the door is open) between body panel 91 and door panel 92.

Figure 10:
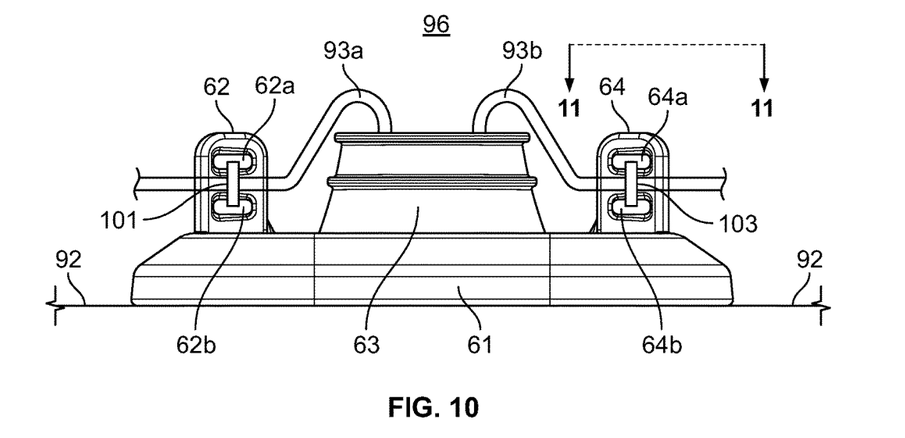
FIG. 10 is a partial side elevational view of the grommet connected with the vehicle door.

FIG. 10 schematically illustrates an application of grommet 10 with the user of strap towers 62, 64. A left tube 93a exits conduit 63. A left strap 101 (e.g., a zip tie) extends through strap apertures 62a, 62b of left strap tower 62, thus retaining left tube 93a. A right tube 93b exits conduit 63. A right strap 103 extends through strap apertures 64a, 64b of right tower strap 64, thus retaining right tube 93b. As shown in FIG. 10, strap towers 62, 64 enable left tube 93a and right tube 93b to extend, within door cavity 96 at right angles with respect to a central axis of conduit 63 and a central axis of oval shaped body 61.

If conduit 63 is sufficiently long and flexible, one of the straps 101, 103 can be used to retain conduit 63 at a right angle with respect to the central axis of conduit 63 and the central axis of oval shaped body 61. The central axis lies normal to the planes in which the ovals of oval shaped body 61 are defined. Thus, conduit 63 may be sized to extend past both strap towers 62, 64. Conduit 63 may thus be flexible. Conduit 63 may be a bellows. Conduit 63 may be rigid.

Figure 11:
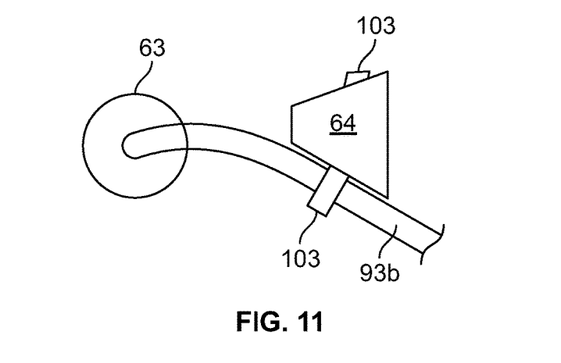
FIG. 11 is a schematic top plan view of a tube secured to a tower strap of the grommet.

As shown schematically in FIG. 11, right strap 103 binds tube 93b to one lateral side of right strap tower 64. Right tube 93b is thus compressed between the one lateral side of right strap tower 64 and right strap 103. As shown in FIG. 10, right strap 103 is wound through both of apertures 64a, 64b to position at least a portion of right tube 93b between apertures 64a, 64b.

Figure 12:
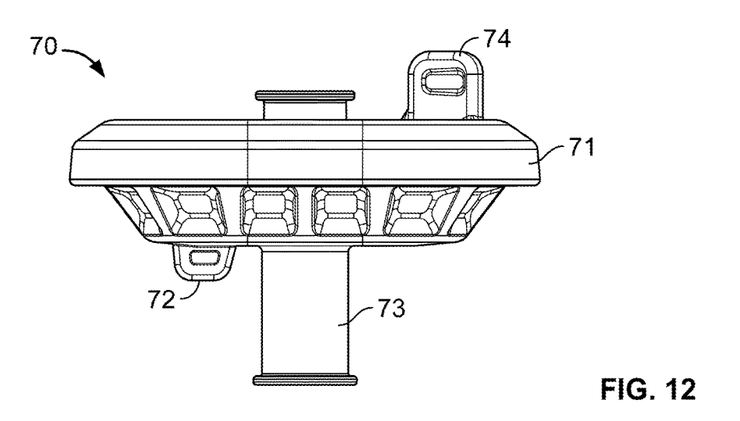
FIG. 12 is a side elevational view of another embodiment of a grommet.
Figure 13:
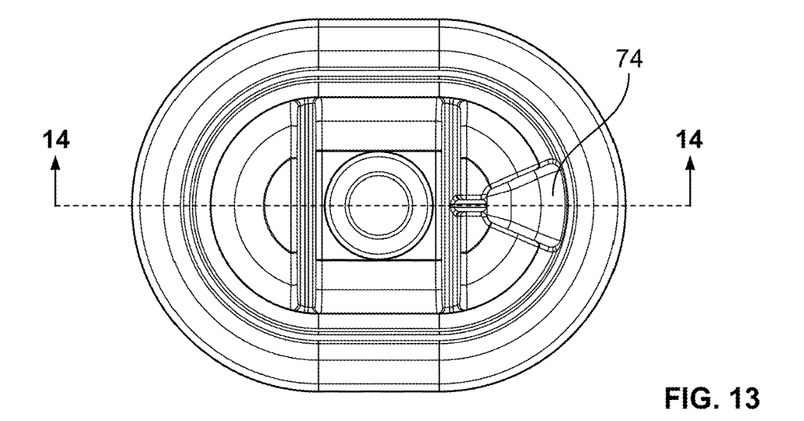
FIG. 13 is a top plan view of the grommet of FIG. 12.
Figure 14:
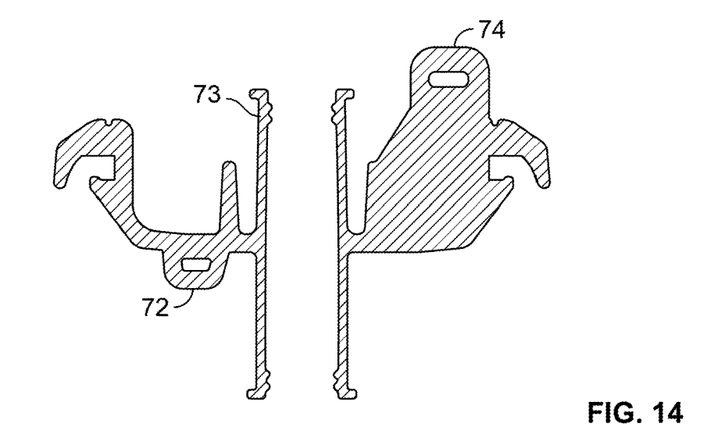
FIG. 14 is a cross sectional view of the grommet taken along 14-14 of FIG. 13.

FIGS. 12 to 14 illustrate another embodiment of door port 70. Here, left strap tower 72 extends in the opposite direction as right strap tower 74. Both towers define a single strap aperture to accommodate straps. It should be appreciated, however, that strap towers 72, 74 may define any number of strap apertures (e.g., each strap tower 72, 74 may define at least two strap apertures). Door port 70 of FIGS. 12 to 14 may represent a complete grommet. Alternatively, door port 70 may be connected to some or all of the components shown in FIG. 1. Conduit 73 may be flexible. One or both sides of conduit 73 may be rigid.

Figure 15:
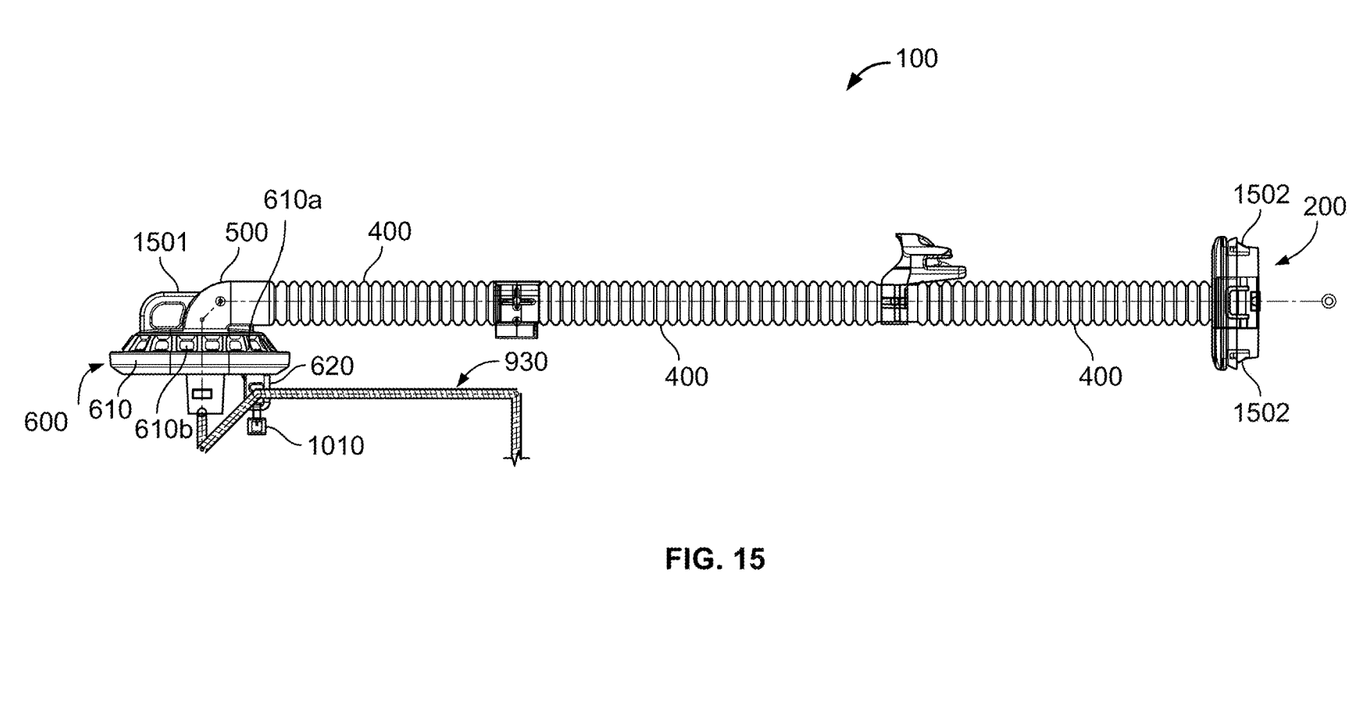
FIG. 15 is a side plan view of another embodiment of a grommet.

FIG. 15 illustrates another embodiment of grommet 100. Door port 600 includes a pull tab 1501. As shown, no first rigid tube is attached to body port 200 (although a first rigid tube may be present). Body port 200 includes a plurality of radially extending alignment projections 1502. Strap or zip tie 1010 secures tube 930 to strap tower 620. Strap or zip tie 1010 extends through both strap apertures of strap tower 620 such that at least a portion of tube 930 is disposed directly between the two strap apertures.

Although ports 20 and 60 were respectively described as being attached to body panel 91 and door panel 92, in practice, they may be reversed such that port 60 attaches to body panel 91 and port 20 attaches to door panel 92. Port 20 may include any of the above-discussed features of port 60.

Disclosed is a grommet for protecting a tube, the grommet comprising a first port, a second port, and a flexible bellows disposed therebetween. The first port defines a central axis and comprises: a conduit leading to the bellows, a first strap tower defining at least one first strap aperture.

The grommet may include some or all of the following features: The first strap tower extends parallel to the central axis of the first port. The first strap tower defines at least two first strap apertures. The at least two first strap apertures are holes extending through an entire width of the strap tower. The first strap tower is tapered, with a narrow end facing toward the conduit and a wide end facing away from the conduit. the first port comprises an annular lip disposed about a periphery of the first port. The first strap tower is disposed closer to the conduit than the annular lip. The annular lip at least partially defines at least one outer notch, the at least one outer notch being open. the at least one outer notch is open on at least three sides. The first port comprises a second strap tower defining at least one second strap aperture. The conduit is disposed between the first and second strap towers. The second strap tower defines at least two second strap apertures. The first strap tower extends in a first direction and the second strap tower extends in a second opposite direction. The conduit is flexible. A central axis of the conduit is configured to extend parallel to the central axis of the first port. the second port comprises two strap towers, each defining two strap apertures.

Disclosed is a protected tube assembly comprising: any of the grommets discussed in this application, a tube extending out of the conduit, a first strap wrapped around the tube and extending through the at least one first strap aperture, the first strap securing the tube to the first strap tower.

The disclosed tube assembly may include some or all of the following features: The tube extends through the first port generally collinear with the central axis of the first port. The tube extends in a direction generally perpendicular to the central axis of the first port adjacent to the first strap tower. The first strap and the first strap tower apply a bending force to the tube, thus retaining the tube in a bent position. The first strap tower comprises at least two first strap apertures. The first strap occupies both of the first strap apertures. central axes of the two first strap apertures are parallel. The first strap retains the tube in contact with the first strap tower. The tube contacts the first strap tower at a position between the two first strap apertures. The first strap tower is tapered. The first strap tower extends parallel to the central axis of the first port. Each of the two first strap apertures are tunnels with two open ends. The first strap is a zip tie. The first strap is tight against the tube and against the first strap tower to keep the first tube static with respect to the first strap tower.

Disclosed is a vehicle comprising: any of the protected tube assemblies disclosed in this patent application; a motor assembly comprising a motor housing and a motor, the motor being configured to drive wheels of the vehicle; a body panel, the body panel being immobile with respect to the motor housing, the body panel defining a body port aperture; a door comprising a door panel, the door being moveable with respect to the body panel and the motor housing, the door defining a door port aperture; the first port being attached to the door panel and at least partially extending through the door port aperture; the second port being attached to the body panel and at least partially extending through the body port aperture.

Disclosed is a grommet for protecting a tube, the grommet comprising: a first port, a second port, and a flexible bellows disposed therebetween; the first port defining a central axis and comprising: a conduit leading to the bellows; a first strap tower defining at least one first strap aperture.

The grommet may include some or all of the following features: The conduit is flexible. A first portion of the conduit extends parallel with the central axis of the first port and a second portion of the conduit extends perpendicular with the central axis of the first port. The conduit is secured to the first strap tower. A first strap extends through the first strap aperture and binds the conduit to the first strap tower. The first strap tower defines at least two first strap apertures. The first strap extends through both of the first strap apertures and extends about a portion of the conduit. The first strap is a zip tie.

Disclosed is a tube grommet assembly comprising: any grommet disclosed herein a flexible tube extending therethrough, the flexible tube either being an electrical cable or a fluid line.

I claim:

1. A grommet for protecting a tube, the grommet comprising:
   a first port, a second port, and a flexible bellows disposed therebetween;
   the first port defining a central axis and comprising:
      a conduit leading to the bellows,
      a first strap tower defining at least one first strap aperture, extending parallel to the central axis of the first port, and defining at least two first strap apertures, wherein the at least two first strap apertures are holes extending through an entire width of the first strap tower.

2. The grommet of claim 1, wherein the first strap tower is tapered, with a narrow end facing toward the conduit and a wide end facing away from the conduit.

3. The grommet of claim 2, wherein the first port comprises an annular lip disposed about a periphery of the first port.

4. The grommet of claim 3, wherein the first port comprises a second strap tower defining at least one second strap aperture.

5. The grommet of claim 4, wherein the second strap tower defines at least two second strap apertures.

6. The grommet of claim 4, wherein the first strap tower extends in a first direction and the second strap tower extends in a second opposite direction.

7. The grommet of claim 1, wherein the conduit is flexible.

8. The grommet of claim 7, wherein a central axis of the conduit is configured to extend parallel to the central axis of the first port.

9. The grommet of claim 1, wherein the second port comprises a clip.

10. A protected tube assembly comprising:
    the grommet of claim 1,
    a tube extending out of the conduit,
    a first strap wrapped around the tube and extending through the at least one first strap aperture, the first strap securing the tube to the first strap tower.

11. The assembly of claim 10, wherein the tube extends in a direction generally perpendicular to the central axis of the first port adjacent to the first strap tower.

* * * * *